United States Patent [19]

Jandrell

[11] Patent Number: 4,575,580
[45] Date of Patent: Mar. 11, 1986

[54] DATA INPUT DEVICE WITH A CIRCUIT RESPONSIVE TO STYLUS UP/DOWN POSITION

[75] Inventor: Louis H. M. Jandrell, Woodside, Calif.

[73] Assignee: Astec International, Ltd., Kowloon, Hong Kong

[21] Appl. No.: 597,509

[22] Filed: Apr. 6, 1984

[51] Int. Cl.[4] ............................................. G08C 21/00
[52] U.S. Cl. ....................................................... 178/18
[58] Field of Search ................ 178/18, 19, 20; 338/90; 346/21

[56] References Cited

U.S. PATENT DOCUMENTS

| | | | |
|---|---|---|---|
| 3,005,050 | 10/1981 | Koenig | 178/20 |
| 3,885,097 | 5/1975 | Pobgee | 178/18 |
| 3,959,585 | 5/1976 | Mattes et al. | 178/18 |

Primary Examiner—Stafford D. Schreyer
Attorney, Agent, or Firm—Fitch, Even, Tabin & Flannery

[57] ABSTRACT

A data input device includes a pair of resistive sheets positioned so as to overlap one another to define a common writing area. These sheets are separated from one another by a layer of material that is only electrically conductive under pressure. An energizing voltage is alternatively applied to each sheet such that the pressure of a stylus or the like at a contact point on the surface of the writing area generates first and second output voltages representative of the X and Y coordinates of the contact point. A circuit periodically biases one of the resistive sheets. The bias circuit causes an overvoltage outside of the normal range of voltages to be generated on this resistive sheet when no electrical contact presently exits between the two resistive sheets, indicating that a stylus is not presently applying pressure to a contact point on the surface of the data input device. This circuit also causes a voltage within the normal range of voltages to be generated on the biased resistive sheet when an electrical contact does exist between the two resistive sheets. Another circuit detects the overvoltage and causes the bias to be maintained on the resistive sheet until a subsequent stylus contact point is created. The first and second output voltages obtained during or just before a stylus-up state are not output.

20 Claims, 5 Drawing Figures

FIG. 4  PRESSURE/RESISTANCE HYSTERESIS CHARACTERISTIC

FIG. 5  CONTACT RESISTANCE BETWEEN TWO RESISTIVE SHEETS AIRSPACED AND 2mm RADIUS STYLUS OPERATED

DATA INPUT DEVICE WITH A CIRCUIT RESPONSIVE TO STYLUS UP/DOWN POSITION

BACKGROUND OF THE INVENTION

The present invention relates generally to data input devices which are responsive to the pressure of a stylus or the like on a writing surface to provide an electrical signal indicative of the position of the stylus on the writing surface and more particularly to a method and apparatus for detecting when a stylus has been either just taken up from the writing surface or just placed down in contact therewith, so as to minimize the generation of erroneous indications of stylus position during such stylus-up or stylus-down transition periods.

Numerous techniques have been taught in the art for the conversion of a position of a contact point on the surface of a data input device to an electrical signal indicative of this position. When used in conjunction with a computer system, such signals are commonly digitized and input to the computer as digital X and Y Cartesian coordinates which uniquely indicate the specific position of the stylus on the surface of the writing area. These digitized X and Y coordinates may then be used to manipulate a pointing cursor on a CRT display screen, as a means for generating graphic information, or in other applications.

A conventional pressure activated, two-dimensional graphic input terminal is disclosed in U.S. Pat. No. 3,959,585 issued to Mattes, et al. Another example is described in U.S. Pat. No. 3,885,097 to Pobgee. Generally, these data input devices use two uniformly conductive resistive sheets that overlap in a common writing area and are separated by a small air gap or in some other way are maintained in a normally spaced apart relationship. Affixed to opposite edges of these resistive sheets are conductive strips such that when an energizing potential is developed across the electrodes of a given resistive sheet, a voltage gradient is created across the sheet in a direction perpendicular to the electrodes.

In operation, these resistive sheets are time-alternately energized to generate two perpendicular voltage gradients. The opposite non-energized sheet acts as a sensing probe which is brought into contact with the energized sheet at the point of pressure contact of a stylus positioned on the surface of the writing area. Preferably, the resistive sheets are oriented orthogonal to one another so that the voltages sensed or generated alternately on each of the two resistive sheets when these sheets are in a non-energized state define respective X and Y coordinates. These coordinates can then be digitized and used by a computer.

More specifically, when the first resistive sheet is energized to create, for example, a voltage gradient in the X dimension, a voltage indicative of the position of the point of application of stylus pressure along the X axis is created on the second non-energized resistive sheet which is in electrical contact with the energized sheet at the stylus contact point This voltage is then transmitted to an output circuit. Similarly, when the second resistive sheet is energized to create a voltage gradient in the Y dimension, a voltage indicative of the position of the point of application of stylus pressure along the Y axis is created on the first resistive sheet which is now in a non-energized state. This second voltage is also transmitted to an output circuit.

A significant drawback of such prior art input devices is that erroneous contact point artifacts tend to be created when a stylus is either being moved up off of the writing surface or is initially being placed on the writing surface. These are also referred to as the stylus-up and stylus-down transition periods. The erroneous coordinate values created by these artifacts cause erroneous jumps in the position of a cursor on a computer display screen or an erroneous line to be drawn, depending on the specific application for the data input device. These spurious and erroneous contact points may be caused by the inherent time-multiplexed nature of the determination of the X-Y coordinates as described above. They may also result from contact bounce created as an electrical contact is either being made or broken between the two resistive sheets in response to stylus pressure. This is especially prevalent where just an air gap is used to separate the two resistive sheets in the absence of stylus contact.

Where the resistive sheets are separated by a thin sheet of elastomeric material which acts as an electrical insulator that becomes conductive at a selected point upon the application of pressure over a suitable threshold at that point, another problem exists. The resistance of the connection created by this elastomeric sheet is a steep but still finite function of applied pressure, such that the voltages sensed during stylus-up or stylus-down transitions not only reflect the position of the stylus on the writing area but also are modified to some unknown extent by this time varying resistance. Finally, a mutual capacitance Cm exists between the two resistive sheets whose charge is unknown at any given time. This charge is discharged through the above-described time varying resistance path created in the elastomeric sheet.

All of these problems result in unreliable stylus position information during stylus-up and stylus-down transition periods.

The problem of having erroneous indications of stylus position is more serious in certain more recent applications of such data input devices. In such applications, the end point of the movement of the stylus on the writing surface is the most important data point to be accurately obtained and output to a computer. For example, if the data input device is being used to move a cursor on a computer screen, the user desires to move the cursor to a specific point on the screen using this data input device. If the user's act of taking the stylus off of the writing surface of the input device, however, causes an erroneous indication of stylus movement, the cursor will move about on the computer screen in the same erroneous manner. Consequently, the user is frustrated from being able to accurately position the cursor at a desired point on the computer display screen. This is especially a problem where the computer detects the stylus-up transition and uses this to automatically start a program chosen by the position of the cursor on the computer screen. Erroneous processing would result in this situation.

One prior art attempt to improve the reliability of stylus position detection during stylus-up and stylus-down transition periods is disclosed in U.S. Pat. No. 3,959,585. Although the method described in this patent includes means for periodically biasing one of the resistive sheets to an overvoltage, this is done merely to limit the capacitive effect of the mutual capacitance between the two resistive sheets. This can be a problem especially when large resistive sheets are used, since the capacitance between the sheets can be large enough to cause potentials to be created on the resistive sheet acting as a sensor even then the stylus is not in contact with the surface of the writing area. What is not taught, however, in this prior art patent is any means for detecting the actual stylus-up or stylus-down transition period by means of overvoltage biasing of a non-energized resistive sheet and for novel uses of this transition period detection, as described herein according to the present invention.

SUMMARY OF THE INVENTION

The present invention is directed to overcoming the prior art problems described above so as to optimize the accuracy of stylus position data output by a data input device. Specifically, the present invention includes means for periodically biasing one of the resistive sheets of a data input device of the type described above such that an overvoltage is generated thereon that is outside the normal range of voltages that would be generated on a non-energized resistive sheet when the resistive sheets are in electrical contact with each other at a stylus contact point. Means are also provided for detecting the overvoltage on the biased resistive sheet, to thereby provide an indication that a stylus-up transition has occurred. In response to this overvoltage detection, the last obtained X-Y coordinates of the stylus are not output by the data input device, so as to prevent any erroneous indication of stylus position resulting from this stylus-up transition to be output to a computer or other data recipient device. The overvoltage bias is maintained on the biased resistive sheet until a subsequent time when a stylus contact point is reestablished in the writing area. The biasing means also includes means for biasing the biased resistive sheet such that if the two resistive sheets are in electrical contact at a contact point during said biasing, the voltage on said biased resistive sheet is within the normal range of voltages expected on this resistive sheet. Means are provided for detecting this normal range voltage and for causing the bias on the biased resistive sheet to be removed. In a preferred embodiment, after each set of X-Y voltage coordinates is generated by said data input device, the biasing means is caused to initiate an overvoltage bias on a resistive sheet to test for the occurrence of a stylus-up condition during the interval since the previous stylus-up test.

To further enhance the accuracy of the position coordinates output by the data input device, the present invention also includes means for averaging a plurality of voltages representative of an X stylus position coordinate and for averaging a plurality of voltages representative of a Y stylus position coordinate such that only averaged values representative of said plurality of X and Y coordinate voltages is output by said data input device. Each X and Y coordinate value may also be compared with a prior such value such that any X or Y coordinate value found to be outside of predetermined range from said previous value will not be output.

Therefore, an object of the present invention is to provide a data input device that is insensitive to stylus-up and stylus-down transition periods such that erroneous stylus position artifacts are suppressed and prevented from being output to a computer system or the like which is receiving the data from the data input device.

Another object of the present invention is to provide a data input device that periodically biases one of the resistive sheets in the data input device to an overvoltage if a stylus contact point does not exist, and to a voltage substantially within the normal range of voltages generated on a non-energized resistive sheet when a stylus contact point does exist, so as to enable reliable detection of a stylus-up or stylus-down transition.

A further object of the present invention is to optimize the accuracy of the X and Y coordinates generated by a data input device by averaging a plurality of voltages representative of the X coordinate position of a stylus, averaging a plurality of voltages corresponding to the Y coordinate position of a stylus and outputting only the averaged X and Y coordinate values.

Yet another object of the present invention is to optimize the accuracy of the X and Y coordinates generated by a data input device by rejecting any X or Y coordinate value that is outside of a predetermined range from a previously obtained respective X or Y coordinate value.

These and other objects and advantages of the present invention will become more apparent upon reference to the accompanying detailed description of the present invention and the following drawings in which:

DETAILED DESCRIPTION

Figure 1:
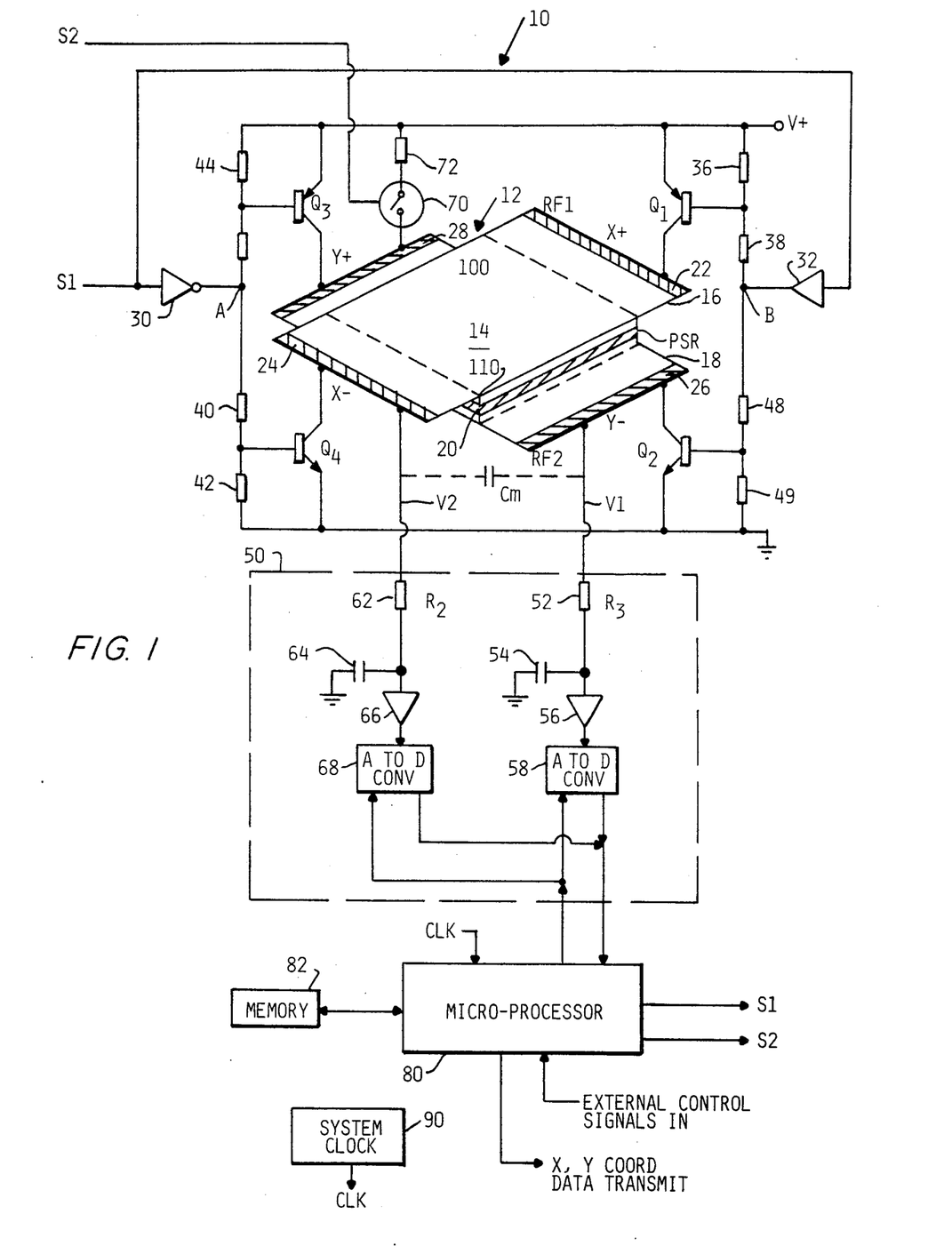
FIG. 1 is a partial schematic and partial block diagram of a data input device according to the present invention.

A preferred embodiment of the present invention is shown in FIG. 1. Illustrated is a two-dimensional position transducing data input device 10 which is activated by a suitable pressure inducing stylus (not shown), such as a pencil, a special stylus, or even a finger. The stylus is applied to a sensor 12 writing area 14 of device 10, which is shown diagrammatically in FIG. 1. Sensor 12 consists of two uniformly conductive resistive sheets 16 and 18 preferably separated by a thin layer of pressure sensitive conductive elastomer 20. Contact is made to the two resistive sheets by means of conductive strips which are formed along two opposite edges of each resistive sheet 16 and 18. Thus, resistive sheet 16 includes conductive strips 22 and 24 and resistive sheet 18 includes conductive strips 26 and 28. The two resistive sheets 16 and 18 are preferably arranged so that the conductive strips on resistive sheet 16 are perpendicular to the conductive strips on resistive sheet 18, as illustrated in FIG. 1.

As described above, resistive sheets 16, 18 are preferably maintained in a spaced apart relationship by a thin layer of pressure sensitive conductive elastomer 20. Preferably, this elastomer 20 provides a resistance characteristic which varies over 6 to 8 orders of magnitude as a function of the pressure applied thereto. The elastomer 20 thus normally acts as an insulative material whose resistivity is on the order of about $10^6$ to $10^8$ ohm cm. If pressure is applied to a localized area of the material 20, resistivity drops to between 1 and 100 ohm cm. A preferred elastomer 20 uses embedded specially shaped metal particles that are normally kept from touching one another by the elastomer material surrounding the metal particles. Thus, insulation and electrical separation across the sheet 20 is normally maintained. When localized pressure is applied to elastomer 20, the metal particles are caused to come in contact with one another in that locality, which results in the desired drop in the resistivity. By choosing the appropriate hardness and thickness of elastomer 20, a desired pressure sensitivity may be achieved.

Note that the stylus may be any object, but it is preferable that the radius of the tip of the object be greater than 2 millimeters. This is necessary for two reasons, to reduce the fatiguing of the pressure sensitive elastomeric layer 20 and to prevent permanent distortion of resistive sheets 16 and 18.

As described above, in the prior art data input devices using two resistive sheets as at 16 and 18, means are provided for alternately energizing these two resistive sheets 16, 18 to alternately establish a voltage gradient on each sheet in a direction defined by the conductive strips formed on the opposite edges thereof. A voltage is generated on the alternately non-energized resistive sheet 16, 18 whose value is a function of the position of a pressure contact point on the energized sheet, each point on the writing area 14 thereby being uniquely defined by a unique combination of voltages on said resistive sheets 16, 18.

For example, if the voltage gradient produced on each resistive sheet 16, 18 is 10 volts from one edge to the other, a contact point 100 on one corner of writing area 14 would generate voltage values of 10 volts on each non-energized resistive sheet 16, 18. If the contact point is at 110 on the opposite corner of writing area 14, the first and second voltages generated on the respective non-energized sheets 16, 18 would be 0 volts each. A contact point in the center of writing area 14 would generate first and second voltages of 5 volts each.

Shown in FIG. 1 is a preferred means for alternately energizing resistive sheets 16 and 18. A select signal S1 having two states, a high and a low state, is generated in a conventional manner, as described below. When select signal S1 is in a low state, resistive sheet 16 is energized and when select signal S1 is high, resistive sheet 18 is energized. As seen in FIG. 1, when select signal S1 is low, node A is caused to go high by means of an inverter 30 and node B is caused to remain low via a buffer 32. This biasing of node A high and B low causes driver transistors Q1 and Q4 to be turned on and driver transistors Q2 and Q3 to remain turned off. More specifically, the emitter of transistor Q1 is shown to be connected to a source of energizing potential V+, such that when node B is low, conventional biasing resistors 36 and 38 cause current to flow through transistor Q1 from V+ to conductive strip 22 on resistive sheet 16. On the opposite edge of resistive sheet 16, with node A biased high, conventional biasing resistors 40 and 42 cause transistor Q4 to be conductive to thereby cause current to flow from conductive strip 24 to ground. The resultant current flow through resistive sheet 16 from the conductive strip 22 to the conductive strip 24 creates a uniform voltage gradient across resistive sheet 16. Both resistive sheet 16 and resistive sheet 18 are conventionally provided with a resistive coating and low resistance connections all along their opposite edges to maximize this uniformity.

At the same time, with select signal S1 low, transistors Q2 and Q3 are caused to remain off to thereby maintain resistive sheet 18 in a non-energized or substantially floating electrical state. The only connection of resistive sheet 18 at this point is to an output circuit 50 described in greater detail hereinbelow, via conductive strip 26. Thus, with the pressure of a stylus or the like being applied to a selected contact point on writing area 14, which may correspond to the surface of resistive sheet 16, the elastomeric layer 20 creates an electrical contact or conductive path between resistive sheets 16 and 18. Once the mutual capacitance $C_m$ between these two sheets is discharged, sheet 18 acts as a voltage sensor to assume the voltage potential existing at the contact point on resistive sheet 16. The value of this voltage depends on where the contact point is along the voltage gradient existing on resistive sheet 16. That is, a voltage is generated on sheet 18 that represents the position of the contact point on sheet 16. This voltage is then detected and output by output circuit 50, as described below.

Similarly, when select signal S1 is switched to a high level, the roles of the two resistive sheets 16, 18 are reversed. With select signal S1 switched high, node A goes to a low level and node B goes to a high level, through the respective action of inverter 30 and buffer amplifier 32. With node A low, conventional bias resistors 44 and 46 cause transistor Q3 to be conductive between the source of energizing potential V+ and conductive strip 28 of resistive sheet 18. Similarly, with node B high, conventional biasing resistors 48 and 49 cause transistor Q2 to be conductive between conductive strip 26 of resistive sheet 18 and ground. This causes a current to flow in sheet 18 from the conductive strip 28 to the conductive strip 26 was energized to create a uniform voltage gradient across resistive sheet 18.

At the same time, with select signal S1 high, transistors Q1 and Q4 are caused to be off to thereby maintain resistive sheet 16 in a non-energized or floating electrical state. Its only connection is to output circuit 50 via conductive strip 24.

Thus, with an electrical contact still existing at the same location across the elastomeric layer 20, as a result of the applied pressure of the stylus or the like on writing area 14, resistive sheet 16 now acts as a voltage sensor, to assume the voltage potential existing at the point of contact on resistive sheet 18. This second voltage is then also detected by output circuit 50, as described below.

As can be seen, the above apparatus enables each point on the writing area 14 to be uniquely defined by a unique combination of voltages, a first voltage generated on resistive sheet 16 and a second voltage generated on resistive sheet 18. With resistive sheet 16 and 18 orthogonal to one another, these two voltages provide a representation of the X and Y Cartesian coordinates of the contact point of the stylus on the writing area 14. As shown in FIG. 1, the first voltage is indicated as V1 and the second voltage is indicated as V2.

FIG. 1 also illustrates conventional elements of an output circuit 50. Voltage V1 is fed through a low pass filter comprising resistor 52 and capacitor 54. The output of this filter is fed to a buffer amplifier 56 whose output is fed to an analog to digital (A-to-D) converter 58 for outputting a digital word representative of each first voltage V1 detected by output circuit 50.

Similarly, second voltage V2 is fed through a low pass filter comprising a resistor 62 and a capacitor 64. The output of this filter is fed to a buffer amplifier 66 whose output is digitized by an analog to digital (A-to- D) converter 68. The output of analog to digital converter 68 is similarly a digital word representative of each second voltage V2 detected by output circuit 50.

According to the present invention, to determine whether or not the stylus has had either a stylus-up or a stylus-down transition, and also to monitor an on-going stylus-up or stylus-down condition, means are provided to periodically bias one of said resistive sheets 16, 18 such that an overvoltage is generated thereon when the two resistive sheets 16, 18 are not in electrical contact. This overvoltage is generally defined to be a voltage within a range of voltages that is outside the normal range of voltages existing on a non-energized resistive sheet 16, 18. By normal range of voltages, what is meant is that during normal operation of sensor 12 when the resistive sheets 16, 18 are in electrical contact with each other at a contact point, the voltage produced will be within a range of voltages and, as described above, this voltage value will be a function of the positions of a stylus with respect to the voltage gradient existing on the energized resistive sheet.

Specifically, as seen in FIG. 1, resistive sheet 18 is shown as being connected to one pole of a switch 70. The other pole of switch 70 is coupled to V+ through a resistor 72. The state of switch 70 is controlled by a signal on line S2. In operation of this biasing means, when signal S2 closes switch 70 to close to thereby create a conductive path, V+ is coupled through resistor 72 to conductive plate 28 of resistive sheet 18. Assuming that select signal S1 is in a low state, which will be true periodically, resistive sheet 18 will be electrically floating insofar as sheet 18 is affected by transistors Q2 and Q3. However, with switch 70 closed, resistive sheet 18 is biased to a voltage which is a function of the resistance of resistor 72 and the amplitude of V+.

According to the present invention, resistor 72 is chosen such that the bias voltage created on resistive sheet 18 is an overvoltage, i.e., a voltage that is in excess of the normal range of voltages that would exist on a non-energized resistive sheet for any contact point being accessed on writing area 14. Thus, an out of range or overvoltage is generated on resistive sheet 18 when signal S1 is low and switch 70 is closed.

The above-identified overvoltage is detected by means of output circuit 50 and is fed to A to D converter 58. A microprocessor 80, operating in a conventional manner as is well known in the art, may be used to provide means for detecting that this voltage is in fact a voltage that is outside the normal range of voltages for a non-energized resistive sheet. This can be provided, for example by maintaining a table of such normal voltages in a memory 82 accessible by microprocessor 80. As is also seen in FIG. 1, microprocessor 80 can also generate, in a conventional manner known in the art, signals S1 and S2.

To ensure that an overvoltage is detected by microprocessor 80 only when no stylus pressure is being exerted on writing area 14, the bias current provided by resistor 72 must also be selected such that when an electrical contact between resistive sheets 16 and 18 does exist, the non-energized sheet will take on a voltage potential that is the normal range of voltages expected to exist on such a non-energized sheet. This is to enable the microprocessor 80 to detect this stylus-down condition, so that it will be able to proceed to turn off signal S2 and thereby turn off the overvoltage bias on resistive sheet 18.

Note that since the bias current continues to contribute an offset effect to resistive sheet 18 during this stylus-down test, the actual voltage detected by the output means 50 may actually be slightly outside of the normal range of voltages for a non-energized sheet, depending on where the contact point position is. That is, a threshold amount created by the bias current contributes to the detected voltage. Consequently, microprocessor 80 will detect a stylus-down condition if the detected voltage is in a range comprising the normal range of voltages plus this threshold value. Of course the chosen overvoltage value, described above, must be in excess of any possible such in-range voltage.

Figure 2:
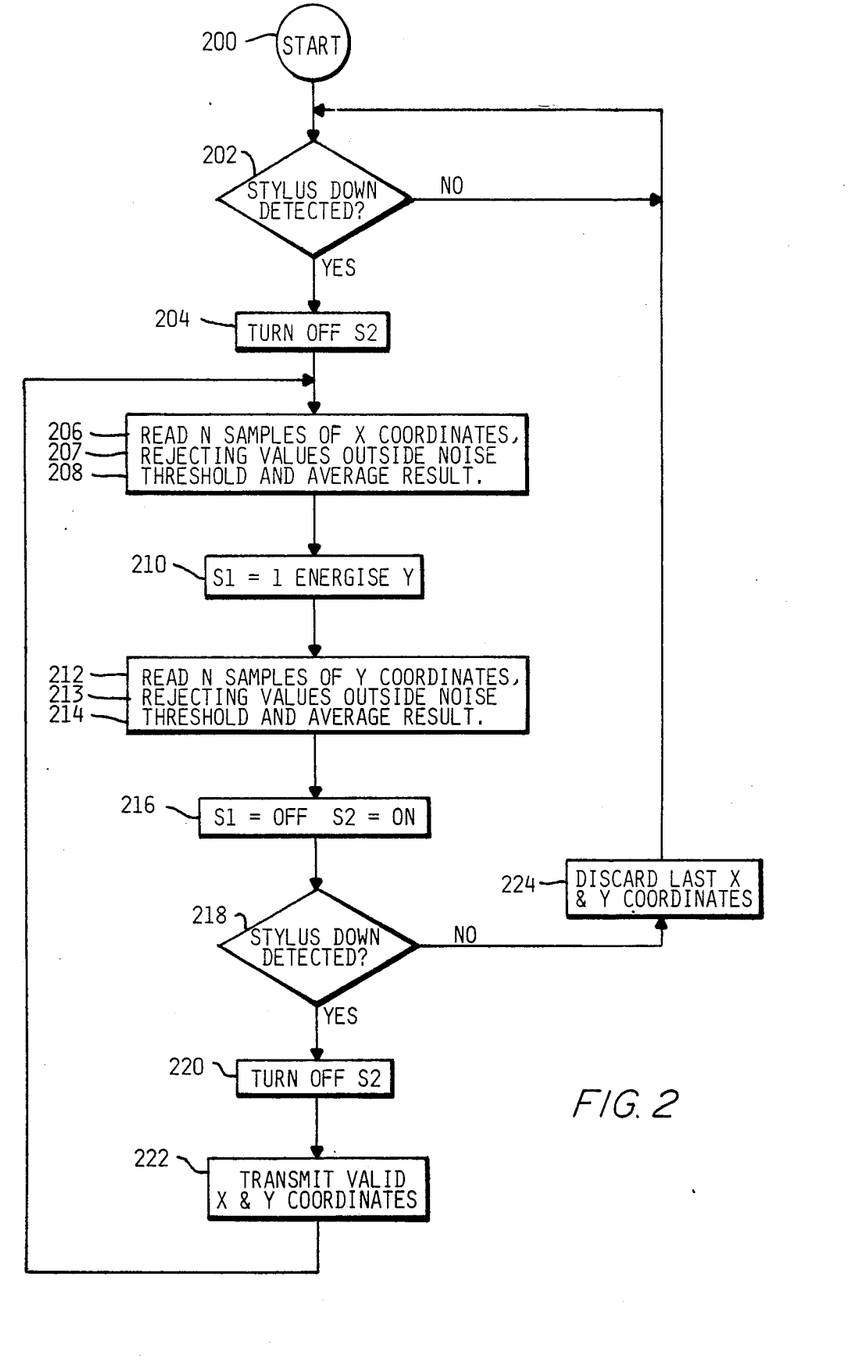
FIG. 2 is a flow chart illustrating the operation of the data input device of FIG. 1.

FIG. 2 is a flow chart illustrating details of the operation of the data input device according to the present invention. More specifically, FIG. 2 illustrates in greater detail the control functions necessary for the operation of the data input device 10 according to the present invention and which is preferably implemented in a conventional manner via a microprocessor and memory, such as the microprocessor 80 and memory 82 illustrated in FIG. 1.

Referring now to FIG. 2, it is presumed for purposes of explanation that the stylus will not initially be in contact with the writing area 14 of data input device 10 and that signal S2 will consequently be high. This is indicated as the start point 200. As a result, switch 70 and resistor 72 are functioning to bias resistive sheet 18 such that whenever signal S1 is low, voltage V2 will be an overvoltage.

The next step in the flow chart is a test to determine if the stylus has come in contact with writing area 14 with sufficient pressure to create an electrical conductive path across elastomeric layer 20 between resistive sheets 16 and 18. As described above, once this occurs, the voltage V2 will drop to a voltage that is either within the normal range of voltages which would exist on a non-energized resistive sheet or at most only a threshold amount outside of said range. This is detected by microprocessor 80, which responds at step 204 by switching the state of signal S2 to a low state to cause switch 70 to open. This removes the bias from resistive sheet 18.

At this point, the sensor 12 is in a condition to proceed with the normal obtaining of voltages representative of X and Y coordinates in the manner as described above. Steps 206 through 214 will be described in greater detail hereinbelow. Note that if the stylus-down condition is not detected at step 202, the microprocessor 80 is conventionally programmed to periodically compare the presently detected voltage V2 with the range of voltages that is indicative of electrical contact between resistive sheets 16 and 18, such that detection of a transition to a stylus-down state is detected a short time after the actual physical event takes place.

As seen at step 16 in FIG. 2, after a selected one or more X and Y coordinates are detected by the data input device 10, as described in greater detail below, microprocessor 80 again switches signal S2 to a high state to again bias resistive sheet 18, as described above, to test to determine as indicated at step 218 whether or not the stylus is still in a stylus-down state. This is accomplished again by comparing the voltage on V2 with the normal range of voltages stored in memory 82. If an overvoltage is detected on V2, this indicates that a stylus-up transition has occurred since the last testing of the stylus-down state. If a voltage substantially within the range of normal voltages is detected, this indicates that the stylus is still in a down state.

Assuming first that the stylus is detected as being still in a stylus-down state, at step 220, the microprocessor 80 again turns off signal S2 thereby reenabling a next sequence of measurements of one or more voltages representative of X and Y coordinates of the stylus position on writing area 14.

At step 222, microprocessor 80 acts to transmit the most recently obtained X-Y coordinate data obtained during the last interval between adjacent tests of stylus-down state. Thus, as can be seen, only when the stylus-down state is found to still be in existence, is the most recent X-Y coordinate data output by microprocessor 80 from the data input device 10. This prevents the outputting by data input device 10 of any erroneous position coordinate data which might otherwise exist in the most recently obtained X-Y coordinate due to the asynchronous timing of a stylus-up transition with respect to the process of detecting voltages representative of X-Y coordinates, as described above.

This latter function is illustrated at step 224 in FIG. 2. If a stylus-down is not detected in step 218, in step 224 the most recent X-Y coordinate data is erased and not output by the data input unit 10. The status of the data input device 10 is then returned to an overvoltage biased state shown at step 102.

Other aspects of the present invention are illustrated in FIG. 2 with reference to steps 206–214. Step 206 illustrates that a plurality of successive voltages representing the X position coordinate of a stylus may be digitized and then in step 208 averaged by microprocessor 80 to generate an X coordinate value representative of this average. Similarly, after signal S1 has changed to a high state at step 210, thereby energizing resistive sheet 18, a plurality of voltages representing the Y coordinate of a stylus position can be detected and digitized and thereafter in step 214 averaged by microprocessor 80 to generate a Y coordinate value representative of this average. The benefit of this process is that a spurious X or Y coordinate voltage value will not significantly adversely effect the ultimate averaged value for the current stylus position. Note that the above described averaging steps may be implemented by microprocessor 80 in a conventional manner well known in the art.

Microprocessor 80 may also be programmed in a conventional manner to reject any X or Y coordinate whose value is not within a threshold amount of an adjacent X or Y coordinate value. The size of this threshold may be selected to compensate for noise values not eliminated by the operation of the low pass filters and high imput impedance amplifiers 56, 66 in output circuit 50 and to reject any detected stylus movement that would exceed a normal movement amount possible during a given X-Y coordinate measurement time interval. That is, microprocessor 80 compares a present X coordinate value with a previously detected X coordinate value and prevents further use or output of the present X coordinate if its value is outside of a predetermined noise threshold range above or below the previously detected X coordinate value. The microprocessor 80 makes a similar comparison for each present Y coordinate value with respect to a previously detected Y coordinate value.

Especially where the X and Y coordinate values are obtained at a substantially faster rate than the normal stylus rate of change of position, both the averaging procedure and the noise threshold comparison procedure will contribute to the optimization of accurate X and Y coordinate data being output by device 10. According to the preferred embodiment, as will be seen with reference to the timing diagram of FIG. 3, each X or Y voltage coordinate measurement may take place at a rate on the order of 40 microseconds per detected voltage. This timing is controlled by the speed of A-to-D convertors 58 and 68. Thus, a significant number of voltage detections can be obtained in a very short period of time from the perspective of the stylus uses.

Figure 3:
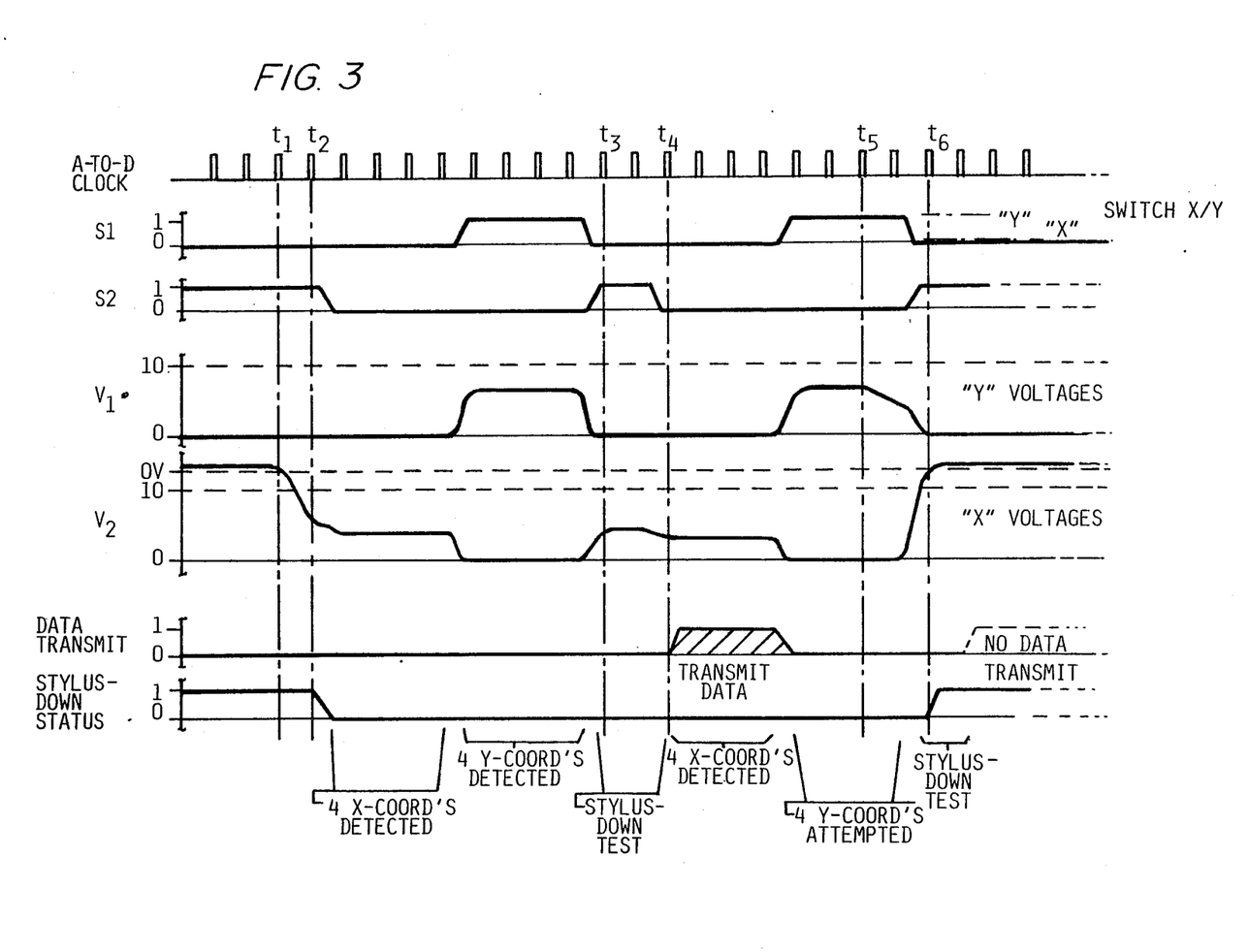
FIG. 3 is a timing diagram which further illustrates the operation of the data input device of FIG. 1.

FIG. 3 illustrates in timing diagram for the operation of the data input device 10 according to the present invention as described in the steps shown in FIG. 2. The basic timing of the data input device 10 is provided by a system clock 90 which is shown in FIG. 1. Clock 90 operates to output a clock pulse which defines the basic time interval for the device 10. Clock 90 enables microprocessor 80 to generate, in a conventional way, the 40 microsecond A to D clock pulses shown in FIG. 3. In the present embodiment, system clock 90 outputs a 4 MHz clock. Microprocessor 80 instruction cycle time is on the order of 1–2 microseconds, thereby enabling microprocessor 80 to do its detection processing in about 10 microseconds. Note that some microprocessors provide a system clock 90 on-chip. In a preferred embodiment, a Motorola 6301 microprocessor may be used. Also shown in FIG. 3 is the timing of the signal levels S1 and S2, the voltage levels V1 and V2 output by respective resistive sheets 18 and 16 and the output data transmit line of microprocessor 80. The bottom timing line illustrates the timing of the detection by microprocessor 80 of the stylus-up and stylus-down states.

As shown in FIG. 3, an exemplary stylus-down interval would begin at time t1, reflecting the actual time that the stylus has come into contact with the writing area 14 of sensor 12. As seen, V2 is initially at its overvoltage point and as pressure is increased pursuant to the application of a stylus to writing surface 14, the resistivity of the elastomeric sheet 20 reduces thereby bringing voltage V2 down within a normal range of voltages for a non-energized resistor sheet. This is exemplified as range 0 to 10 in FIG. 3. At time t2, the voltage V2 is detected by microprocessor 80 as being substantially within the normal range of voltages. As a result, microprocessor 80 indicates that transition to a stylus-down state has been detected. Note that the bias current provided by resistor 72 to the non-energized resistive sheet 18 must be such that sheet 18 will take on a voltage potential substantially within the normal range of voltages appearing on the non-energized sheet within a single X-Y coordinate measurement time. Otherwise the next coordinate value or values will still not accurately reflect stylus position. Similarly, note that this bias current should also be high enough to bring the voltage on the non-energized resistive sheet above the normal range of voltages within a single coordinate measurement time to insure accuracy of the most recent previously obtained X-Y coordinate values.

As further shown in FIG. 3, after time t2, level S2 goes low, thereby turning off the overvoltage bias on resistor sheet 18. Subsequently, four X and then four Y voltage coordinates are detected, digitized and averaged by output circuit 50 and microprocessor 80. At time t3, signal S2 goes high again to test to determine that the stylus is still in a stylus-down state. Since at this time V2 rises only to a voltage within the normal voltage range of a non-energized resistive sheet, microprocessor 80 can determine that the stylus is in fact still down. Thereafter, four more X coordinate values are detected. During this time, at time t4, the averaged X and Y coordinate values from the previous interval are transmitted by microprocessor 80 out from the data input device 10. After the four X coordinate values are detected, during the later detection of the corresponding Y coordinate values, at time t5, the stylus is physically lifted off of the writing area 14. Microprocessor 80 detects this overvoltage when it tests again for a stylus-down state at time t6. As mentioned above, at this point the bias current must be large enough to raise the voltage on the non-energized sheet to an overvoltage in less than one measurement time from the time that the stylus has been removed from contact with writing area 14. As can be seen, once the overvoltage condition has been detected at time t6, the signal S2 stays high so as to maintain an overvoltage bias on said resistive sheet 18. In an alternate embodiment, note that a stylus-down test could also be performed between the detection of each X and Y coordinate value.

Figure 4:
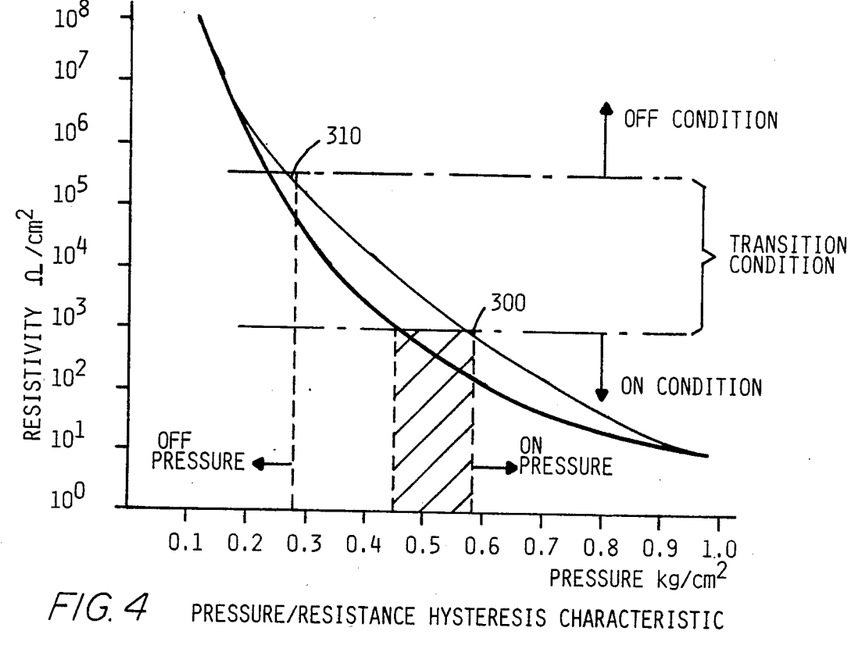
FIG. 4 is a graphical representation of the operation of a pressure conductive insulative sheet used to separate the two resistive sheets of the data input device according to the present invention.

It should also be noted that to determine a reliable stylus-down condition, the bias current should be large enough to maintain the voltage on the non-energized sheet at a value above the normal range of voltages until the resistivity of the pressure sensitive elastomeric material 20 has been reduced below approximately 1,000 ohm cm. This latter point is illustrated in FIG. 4 which shows the characteristics of an exemplary pressure sensitive elastomeric sheet 20 where the resistivity is a function of the pressure applied to the conductive sheet. As is seen, only as the pressure exceeds point 300 does a stylus-down condition become reliably shown. The pressure difference between point 310 and 300 is a transition region wherein reliable stylus-down status is not shown. When the pressure is less than the pressure illustrated at point 310, a stylus-up condition is indicated.

Figure 5:
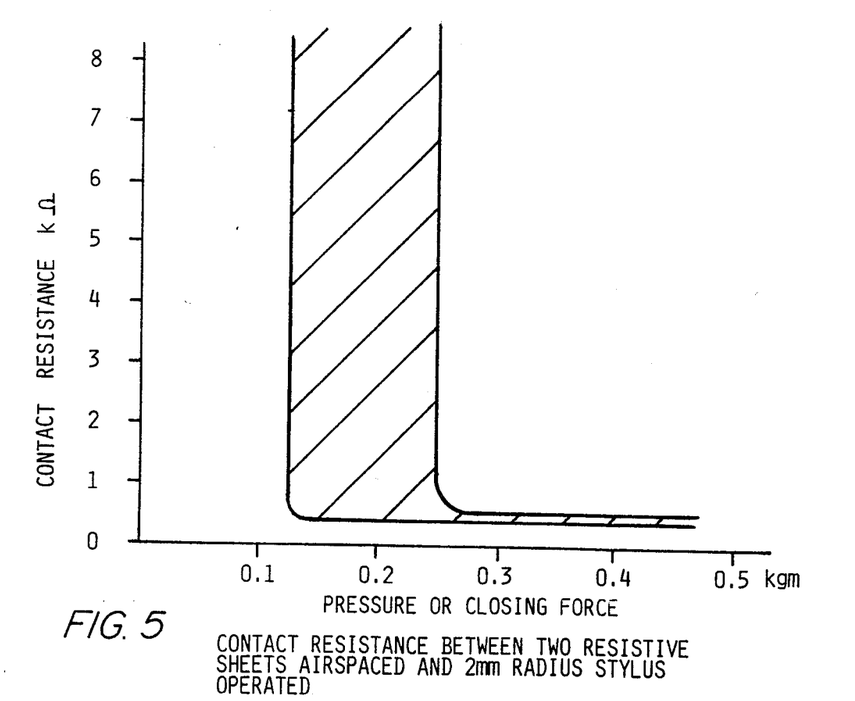
FIG. 5 is a graphical representatation of the operation of an air gap to separate two resistive sheets of a data input device.

Note also that FIG. 4 shows that the on and off characteristics of elastomeric sheet 20 take on the form of a hysteresis curve. This provides a switching indication that is preferable to an air gap. That is, a well-defined switching slope that is not too steep and where the hysteresis curve is narrow, improves the switching transitions, such that contact bounce is minimized. FIG. 5 shows, for comparison, a hysteresis curve of an air gap switch where the resistance versus pressure curve is very steep. The hysteresis curve is also broader. This curve indicates that much greater contact bounce problems will result. Such contact bounce readings would cause rapid fluctuations of the voltage converted by an A to D converter 58, 68 for small variations of stylus pressure, which is not preferable in light of the availability of an elastomeric sheet 20 as described above.

It is of course understood that although the preferred embodiments of the present invention have been illustrated and described, various modifications, alternatives and equivalents thereof will become apparent to those skilled in the art, and, accordingly, the scope of the present invention should be defined only by the appended claims and equivalents thereof.

What is claimed is:

1. In an apparatus having a writing surface and a means for generating an electrical signal representative of a contact point location on said writing surface including:

first and second resistive sheets positioned so as to overlap one another to define said writing surface;

means for maintaining said first and second resistive sheets in a spaced apart relationship such that said sheets are adapted for electrical contact with each other at a point corresponding to said contact point only when pressure is applied at said contact point;

a source of energizing potential;

means for alternately energizing said first and second resistive sheets to alternately establish a voltage gradient on each of said sheets in a direction different from one another such that a voltage is generated on the alternately non-energized sheet whose value is a function of the position of said contact point on the energized sheet, each point on said writing area thereby being uniquely defined by a unique combination of voltages on said first and second resistive sheets; and means for detecting and outputting the voltage appearing on each resistive sheet when said sheet is in a non-energized state such that during each alternate energizing cycle first and second voltages are obtained and output which are uniquely representative of the present position on the writing surface of said contact point, an improvement comprising:

means for periodically biasing one of said resistive sheets such that an overvoltage is generated thereon when said first and second resistive sheets are not in electrical contact with each other at a contact point, said overvoltage defined to be a voltage that is outside of the normal range of voltages that can exist on a non-energized resistive sheet when said first and second resistive sheets are in electrical contact with each other at a contact point;

overvoltage detection means responsive to said detecting means for detecting when said one of said resistive sheets has an overvoltage generated thereon; and means responsive to the detection of said overvoltage for preventing the output of voltages by said outputting means and for maintaining said bias on said one of said resistive sheets.

2. The improvement of claim 1 wherein said means for periodically biasing one of said resistive sheets includes means for biasing said one of said resistive sheets such that an in-range voltage not exceeding said normal range of voltages plus said threshold value is generated thereon if said first and second resistive sheets are in electrical contact at a contact point, said overvoltage detection means including means for detecting when said voltage is within the normal range of voltages on said one of said resistive sheets;

means responsive to the detection of said in-range voltage for disabling said overvoltage responsive means such that said bias on said one of said resistive sheets is removed.

3. The improvement of claim 1 wherein said outputting means further comprises means for preventing the output of the first and second voltages that had been most recently detected by said detection means prior to the detection of an overvoltage by said overvoltage detection means.

4. The improvement of claim 1 wherein said means for maintaining said first and second resistive sheets in a spaced apart relationship comprises an insulative sheet positioned between said first and second resistive sheets and in contact therewith and adapted to become electrically conductive when pressure applied to said insulative sheet exceeds a predetermined minimum threshold.

5. The improvement of claim 4 wherein said insulative sheet includes a plurality of metal particles distributed through the insulative sheet such that when pressure is applied to said insulative sheet above a predetermined minimum threshold, said metal particles create an electrically conductive path across said insulative sheet at the point of contact of said pressure.

6. The improvement of claim 1 further comprising means responsive to said outputting means for averaging a plurality of successive first voltages and for averaging a plurality of successive second voltages and including means for outputting a first value representative of the average of said first voltages and a second value representative of the average of said second voltages.

7. The improvement of claim 1 further comprising means responsive to said outputting means for optimizing the accuracy of said electrical signal representative of the location of a contact point on the surface of a writing area.

8. The improvement of claim 7 wherein said optimizing means comprises:
 means for comparing a value representative of said first voltage with a value representative of a first voltage previously detected, and for preventing the output of said value representative of said first voltage if said value is outside of a predetermined range above or below said previously detected first voltage value; and
 means for comparing a value representative of said second voltage with a value representative of a second voltage previously detected, and for preventing the output of said value representative of said second voltage if said value is outside of a predetermined range above or below said previously detected second voltage value.

9. The improvement of claim 1 further comprising means for preventing the output of the first and second voltages that had been obtained most recently prior to the detection of an overvoltage by said overvoltage detection means.

10. In an apparatus having a writing surface and a means for generating an electrical signal representative of a stylus position on said writing surface including:
 first and second resistive sheets positioned so as to overlap one another to define said writing surface;
 means for maintaining said first and second resistive sheets in a spaced apart relationship such that said sheets are adapted for electrical contact with each other at a point on said writing area specified by pressure from said stylus;
 a source of energizing potential;
 first means for periodically energizing said first resistive sheet and for detecting a first voltage on said second resistive sheet representative of stylus position along an X coordinate axis;
 second means for periodically energizing said second resistive sheet alternately with said first means and detecting a second voltage on said first resistive sheet representative of stylus position along a Y coordinate axis; and
 means for outputting said first and second voltages, an improvement comprising:
 means for periodically biasing one of said resistive sheets such that an overvoltage is generated thereon when said first and second resistive sheets are not in electrical contact with each other at the point on said writing area under pressure from said stylus, said overvoltage defined to be a voltage that is outside of the range of voltages normally existing on a non-energized resistive sheet when said first and second resistive sheets are in electrical contact with each other at a contact point;
 overvoltage detection means for detecting when said one of said resistive sheets has an overvoltage generated thereon; and
 means responsive to the detection of said overvoltage for maintaining said bias on said one of said resistive sheets.

11. The improvement of claim 10 wherein said means for periodically biasing one of said resistive sheets includes means for biasing said one of said resistive sheets such that an in-range voltage substantially within said normal range of voltages is generated thereon if said first and second resistive sheets are in electrical contact at a contact point, said overvoltage detection means including means for detecting said in-range voltage;
 means responsive to the detection of said in-range voltage for disabling said overvoltage responsive means such that said bias on said one of said resistive sheets is removed.

12. The improvement of claim 11 wherein said means for periodically biasing one of said resistive sheets includes means for biasing said one of said resistive sheets after each said detection of a first and second voltage representative of X and Y coordinates of a stylus position on said writing surface.

13. The improvement of claim 10 further comprising means responsive to said outputting means comprising:
 first averaging means for forming an average of a plurality of said first voltages and for outputting an X coordinate value representative of said average of said plurality of said first voltages;
 second averaging means for forming an average of a plurality of said second voltages and for outputting a Y coordinate value representative of said average of said plurality of said second voltages; and
 means for preventing the outputting of said X and Y coordinate values by said first and second averaging means, respectively, that had been obtained most recently prior to the detection of an overvoltage by said overvoltage detection means.

14. The improvement of claim 13 further comprising:
 means for detecting when a first voltage is outside of a determined range from the other said plurality of first voltages averaged by said first averaging means and for eliminating said out of range first voltage from said average formed by said first averaging means; and
 means for detecting when a second voltage is outside of a determined range from the other said second voltages averaged by said second averaging means and for eliminating said out of range second voltage from said average formed by said second averaging means.

15. A method for outputting an accurate electrical signal representative of the most recent position of a stylus on a writing surface, with an apparatus having first and second resistive sheets positioned so as to overlap one another to define said writing surface, means for maintaining said first and second resistive sheets in a spaced apart relationship such that said sheets are adapted for electrical contact with each other at a point on said writing surface specified by pressure from said stylus, and a source of energizing potential, comprising the steps of:

I(a) energizing said first resistive sheet and detecting an X coordinate voltage on said second resistive sheet representative of stylus position along an X coordinate axis;

(b) energizing said second resistive sheet and detecting a Y coordinate voltage on said first resistive sheet representative of stylus position along a Y coordinate axis;

(c) energizing one of said first and second resistive sheets and at the same time biasing the other of said first and second resistive sheets such that if a point contact exists between said first and second resistive sheets the voltage generated on the other of said first and second resistive sheets is substantially within the normal range of voltages detected on an unbiased non-energized resistive sheet in contact with an energized resistive sheet, and if no contact between the two resistive sheets exists the voltage generated on said other resistive sheet is an overvoltage outside of said normal range of voltages;

(d) detecting if the voltage generated in step (c) on said other resistive sheet is substantially within said normal range of voltages;

(e) removing the bias on said other resistive sheet and repeating of steps (a)–(c) where the voltage detected in step (d) is substantially within said normal range of voltages;

(f) detecting if the voltage generated in step (c) is an overvoltage;

(g) maintaining the bias on said other resistive sheet where said overvoltage is detected in step (f);

(h) periodically detecting the voltage on said other resistive sheet and detecting when said voltage drops to a value substantially within said normal range of voltages for a non-energized resistive sheet; and (i) removing the bias on said other resistive sheet and repeating of steps (a)–(c) where the voltage detected in step (h) is substantially within said normal range of voltages.

16. The method of claim 15 further comprising the step of outputting the X and Y coordinate voltages obtained in steps (a) and (b) if a voltage substantially within said normal range of voltages is detected in step (c) and not outputting said X and Y coordinate voltages if an overvoltage is detected in step (c).

17. The method of claim 16 further comprising the steps of:

averaging a plurality of successive X coordinate voltages and generating an X coordinate average therefrom;

averaging a plurality of Y coordinate voltages and generating a Y coordinate average therefrom.

18. The method of claim 17 further comprising the steps of:

eliminating from said X coordinate average any X coordinate voltages that are outside of a predetermined range, at least one other X coordinate voltage being averaged; and eliminating from said Y coordinate average any Y coordinate voltages that are outside of a predetermined range from at least one other Y coordinate voltage being averaged.

19. A method for improving the accuracy of electrical signals output by a data input device that are representative of the contact point position of a stylus on a writing surface, said input device having first and second resistive sheets positioned so as to overlap one another to define said writing surface, means for maintaining said first and second resistive sheets in a spaced apart relationship such that said sheets are adapted for electrical contact with each other at a point corresponding to said contact point only when pressure is applied at said contact point, a source of energizing potential, means for alternately energizing one of said first and second resistive sheets to alternately establish a voltage gradient on each of said sheets in a direction different from one another and for maintaining the other of said first and second resistive sheet in a non-energized state such that a voltage is generated on each said non-energized sheet whose value is a function of said contact point position of said stylus on said writing surface, each point on said writing surface thereby being defined by a unique combination of first and second voltages on said first and second resistive sheets, and means for outputting said first and second voltages, comprising the steps of:

(a) periodically biasing one of said resistive sheets to an overvoltage when said sheet is not in electrical contact with the opposite energized resistive sheet, said overvoltage defined to be a voltage that is outside the normal range of voltages existing on a non-energized resistive sheet plus a threshold value, when said resistive sheets are in electrical contact with one another, said biasing means acting to create a voltage on said non-energized resistive sheet that is within said normal range of voltages plus said threshold value if an electrical contact exists between said two resistive sheets;

(b) maintaining said overvoltage bias on said one of said resistive sheets in response to the detection of an overvoltage until subsequent electrical contact between said resistive sheets is reestablished;

(c) removing said overvoltage bias and maintaining said bias removed for a selected period in response to said reestablishing of electrical contact between said resistive sheets; and (d) repeating of step (a).

20. The method of claim 19 further comprising the step of preventing the outputting of the first and second voltages obtained immediately preceding the detection of said overvoltage.

* * * * *